US007734626B2

(12) United States Patent
Jaehnig

(10) Patent No.: US 7,734,626 B2
(45) Date of Patent: Jun. 8, 2010

(54) COMPUTERIZED REGISTRATION SYSTEM FOR MULTIPLE USES

(76) Inventor: William E. Jaehnig, 140 Stanton Dr., Springboro, OH (US) 45066

( * ) Notice: Subject to any disclaimer, the term of this patent is extended or adjusted under 35 U.S.C. 154(b) by 269 days.

(21) Appl. No.: 11/845,147

(22) Filed: Aug. 27, 2007

(65) Prior Publication Data

US 2009/0063558 A1    Mar. 5, 2009

(51) Int. Cl.
*G06F 17/30* (2006.01)
(52) U.S. Cl. ...................................... 707/736
(58) Field of Classification Search .............. 707/2, 707/104.1, 736; 382/118
See application file for complete search history.

(56) References Cited

U.S. PATENT DOCUMENTS 7,558,408 B1 *  7/2009  Steinberg et al. ............ 382/118

FOREIGN PATENT DOCUMENTS

| JP | 11009433 | 1/1999 |
|---|---|---|
| JP | 2003099548 | 4/2003 |
| JP | 2005259096 | 9/2005 |

* cited by examiner

*Primary Examiner*—Etienne P LeRoux
(74) *Attorney, Agent, or Firm*—R. William Graham

(57) ABSTRACT

A system for obtaining associated personal data of a person attending a reception site in order to provide a response to such person includes a computer operably disposed at the reception site having operating software thereon and follow-up software for receiving personal name and address information data for the person and event data and storing for subsequent retrieval the personal name and address information data and the event data in a memory of the computer and camera operably associated with the computer and the follow up software for acquiring an image data of the person such that the follow-up software stores for subsequent retrieval the image data in a manner to be associated with the personal name and address information data in a memory of the computer based device. A method is also provided.

20 Claims, 2 Drawing Sheets

COMPUTERIZED REGISTRATION SYSTEM FOR MULTIPLE USES

FIELD OF INVENTION

This invention relates to a method and system for associating personal data of a person and for providing follow-up contact with such person. More particularly, the invention relates to a method and system for associating personal data of a person obtained at an event registration for prospecting, preplanning, providing a thank you response or other follow up with respect to such person.

PRIOR ART

The manner in which thank you responses are generated in response to attending a wedding or funeral reception, for example, requires improvement. Attendees of such events typically are presented with a sign-in guest or registry book or ledger for writing their name. After the event, the names are obtained from the guest or registry book in order to prepare a thank you or other response to the attendee. In some instances, it can be difficult to read hand writing of the attendee and/or other information relating to the attendee so that a proper response can be made to the attendee.

If the name and information can be ascertained, a traditional thank-you card, for example, is prepared and sent to the attendee. This process of obtaining the information and addressing the envelope with the correct address, city, state and zip code is a time-consuming event. Some events, like a funeral, compound this as family does not always know an attendee and/or the attendee's address.

In such cases, it can be quite an undertaking identifying who attended and associate names with faces as well as corresponding address information. In cases of large gatherings such as funerals or weddings, for example, a response is typically not generated for a month or more due to such circumstances surrounding the event.

The prior art recognized that computer generated address labels for such response can be time-saving. However, the problem of data entry of information remains and handwritten responses and envelopes are in many instances still the socially acceptable standard for formal correspondence.

One attempt at solving the problem is to provide a sign-in envelope/page which allows the recipient to send out a timely thank-you response. While this provided a solution to a relatively quick response, the prior art fails to memorialize the particular event in a way that the recipient can reflect back and appreciate all who attend, nor did it account for illegible handwriting.

Accordingly, the present invention provides an improvement over the art. The instant invention and improvements thereof will be apparent from reading the following description and viewing the drawings.

SUMMARY OF THE INVENTION

It is an object to improve upon a method and a system for associating personal data of a person for providing follow-up contact with such person.

It is an object to provide a method and a system for obtaining associated personal data of a person at a reception site in order to provide a response to such person.

Accordingly, the present invention is directed to a system for obtaining associated personal data of a person at a reception site in order to provide a response to such person. The system includes a computer based device operably disposed at the reception site having operating software thereon and follow-up software for obtaining personal data and storing for subsequent retrieval the personal data in a memory of the computer based device. The computer based device can be operably connected to an image acquisition device, such as a camera, for acquiring an image data of the person at a time concurrent with obtaining the person's name and address information data (hereinafter personal data). The follow-up software is equipped to associate all personal data for one person in a particular follow-up data file. The follow-up data files is equipped to permit entry of event data, such as host or deceased personal data and image data and can be operably associated with a particular event data file.

In addition, the follow-up software can be preferably operably associated with a database of preexisting names, addresses, telephone numbers, e-mail address, and or image data to enable speedy population of personal data. Such databases can include telephone directory databases, state and/or federal agency databases, for example. The follow-up software can provide for prompts for name, address, city, state and zip code and a tablet screen keyboard can be employed so that the person (attendee/guest) can enter his/her information. Again, the camera can be concurrently initiated at this point to record an image of the person at such time so that the data can be linked for a particular person. Optionally, the camera can be positioned at a point of entry of the guests and linked to the computer based device which in turn can be operably associated with a database for facial recognition and generate other personal data in the instance where the attendee does not sign into the registry book. In this regard, the device can employ a facial recognition software and in the existing database.

The follow-up software can also be equipped to optionally initiate a predetermined follow up response upon acquiring personal data for such person at the reception site. Such response can include generating a thank you or other response message and where the computer based device is operably associated with a printing device, to generate a printed thank you or other message to the person can be generated. The computer based device can also be operably associated with a web based server to enable a web based viewing of the particular event data file and associated personal follow-up data files associated therewith. In addition, such response can be automatically generated as an e-mail via follow-up software.

The method and system perform multiple functions. The invention allows for a virtual registry or guest book to be accessible from anywhere over the Internet and provide a digital record of personal and event data of the guests who attended the occasion. A method employing these components is also provided.

The invention provides for quick address generation whether for manual or computer generation. Another advantage of the invention is to provide a faster way to send out a thank-you response or a notice of any kind following a particular event. The present invention can also provide assistance as a pre-need tool or prospecting tool for the attendees.

DETAILED DESCRIPTION OF THE PREFERRED INVENTION

Figure 1:
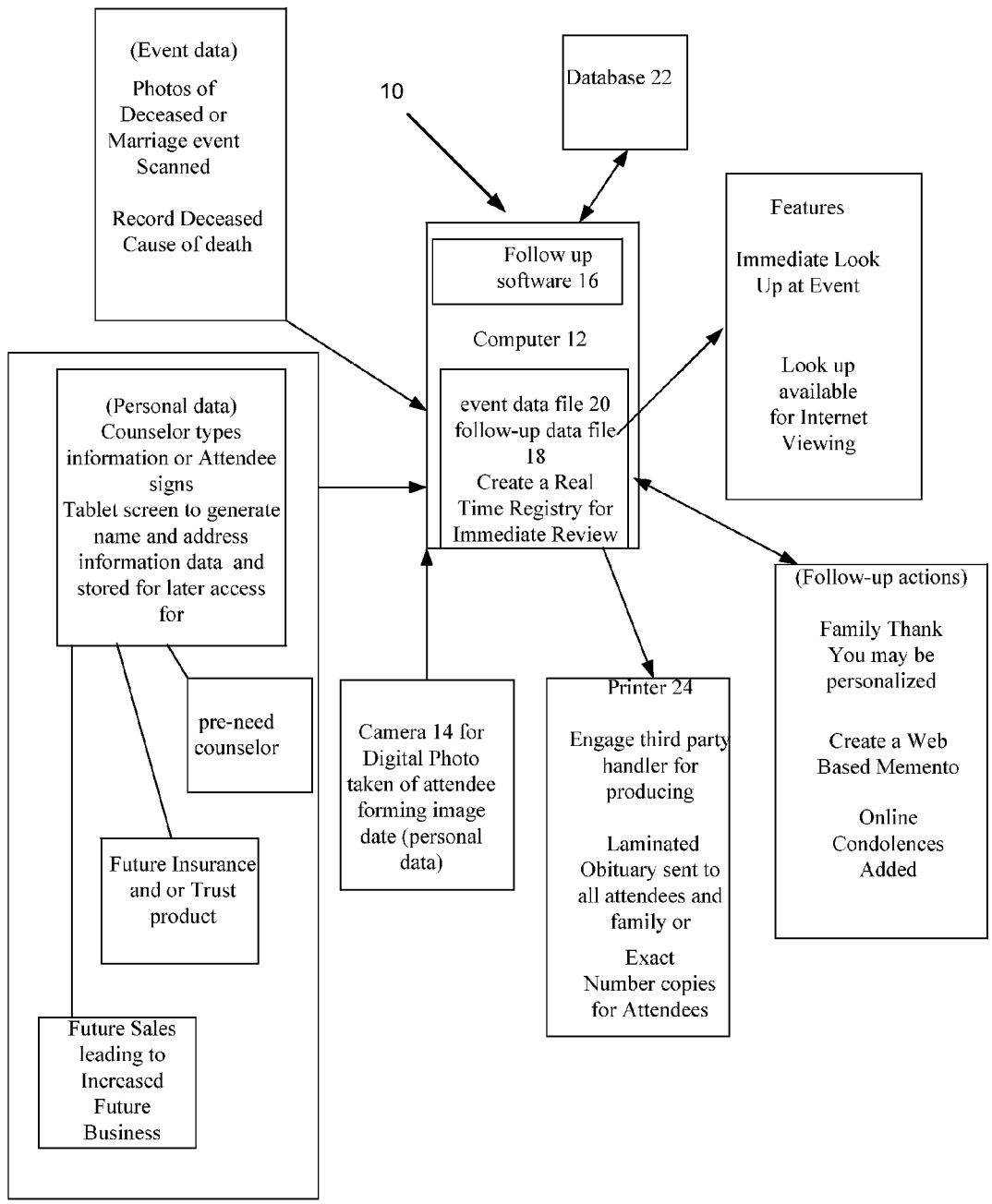
FIG. 1 is a schematic operational diagram of the invention.
Figure 2:
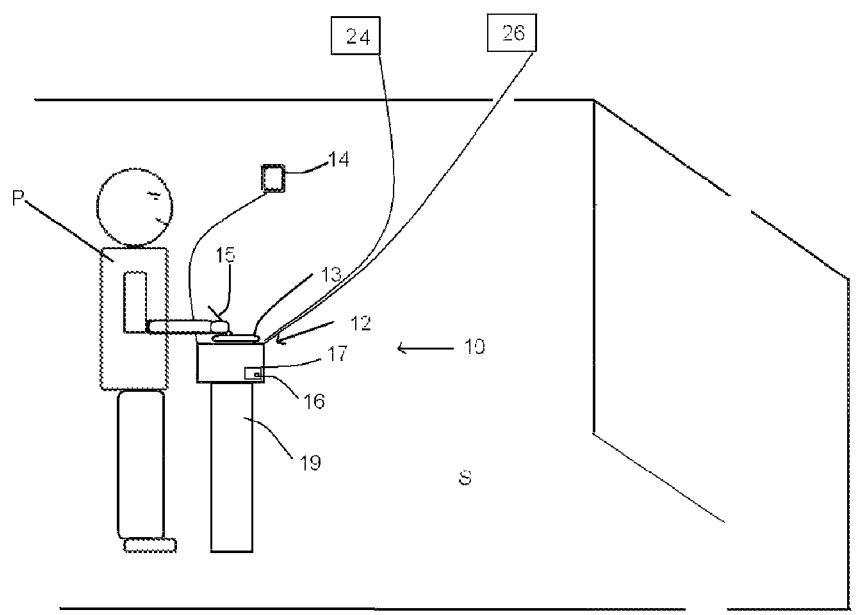
FIG. 2 is a block diagram of the invention.

Referring now to the drawings, the system for obtaining associated personal data of a person (e.g., attendee) P at a reception site S in order to provide a response to such person P is generally represented by the numeral 10. The system 10 includes a computer based device 12 which can be operably disposed at the reception site S upon a podium 19 as seen in FIG. 2. The computer based device 12 can preferably include operating hardware and software, memory 17, associated mouse and a tablet screen entry 13 with associated pen 15 to permit character recognition entry, although other conventional keyboard technology is envisioned. Additionally, an image acquisition device 14, such as a camera, is operably connected to the computer based device 12 for purposes as will be apparent herein.

The computer based device 12 can include in its memory 17 follow-up software 16 for obtaining personal data and storing personal data for subsequent retrieval in a memory 17 associated with the computer based device 12. The memory 17 can be local as shown or remotely located to the computer based device 12. The follow-up software 16 can initiate acquiring an image data of an attendee P when at the podium 19 and at a time concurrent with obtaining the person's name and address information data (hereinafter personal data) (or the image can be independently acquired and input). The follow-up software 16 is equipped to associate all personal data for one person in a particular follow-up data file 18. The follow-up data file 18 can be operably associated with a particular event data file 20 wherein the follow up software 16 is equipped to permit entry of event data, such as host or deceased personal data and image data (photo of marriage or deceased) in the particular event data file 20.

In addition, the follow-up software 16 can be preferably operably associated with a database 22 (which can for example be located remotely and accessible over the Internet) of preexisting names, addresses, telephone numbers, e-mail address, and or image data to enable speedy population of personal data. Such databases can include telephone directory databases, state and/or federal agency databases, for example. The follow-up software 16 can provide for prompts for name, e-mail address, address, city, state and zip code and the tablet screen keyboard can be employed so that the attendee/guest can easily enter his/her information.

Again, the camera 14 can be concurrently initiated at this point to record an image of the person P at such time so that the personal data can be linked for person P. Optionally, the camera 14 can be positioned at a point of entry of the attendees and linked to the computer based device 12 which in turn can be operably associated with database 22 for facial recognition and generate other personal data in the instance where the attendee P does not sign in using the tablet screen 13. In this regard, the device 12 can employ biological (such as facial) recognition software and access and generate personal data for such person P and the information quickly populated with such aid.

The follow-up software 16 can also be equipped to optionally initiate a predetermined follow up response upon acquiring personal data for such person P at the reception site S. Personal data can be input by a representative (such as counselor) or attendee P which signs and inputs the information via tablet screen 13 to generate name and address information data. The personal data is stored for later access by counselor for future contact such as to present future insurance and/or a trust product, or future sale of the product herein. Additionally, event data such as photos of deceased event (cause of death) or marriage event and can be scanned or otherwise input as digital information. The personal data makes up the personal data file 18 and the event data makes up the data file 20 which are associated and later accessible for immediate review over the computer based device 12 or via the Internet.

The access to such data files provides for multiple follow-up actions to be readily performed. Such actions can include generating a thank you, printing or sending digital memento, or other response message and where the computer based device 12 is operably associated with a printing device 24, to generate a printed thank you or other message to the person P. In this regard, the computer based device 12 through the follow up software 16 via the Internet enables engaging a third party handler for producing such response, e.g., thank you cards or laminated obituary which can be sent to all attendees and family members. The computer based device 12 can also be operably associated with a web based server 26 to enable a web based viewing of the particular event data file 20 and associated personal follow-up data file 18 associated therewith. In addition, such response can be automatically generated as an e-mail via follow-up software 16.

The invention permits the immediate look up and review of event data file 20 and personal data file 18 locally or over the Internet. The follow-up software 16 can be equipped with a password protected access if so desired to permit access to such data or provide such data in a read only format and thus the follow up software 16 is equipped to selectively permit access to said data to a viewer. Accordingly, attendees can access the data files 18 and 20 and respond with or to the party holding the event, such as by sending a condolence response to a bereaved family member.

By so providing, the invention performs multiple functions. The invention allows for a virtual registry or guest book to be accessible from anywhere over the Internet and provide a digital record of personal data of the guests who attended the occasion.

The invention provides for quick address generation whether for manual or computer generation. Another advantage of the invention is to provide a faster way to send out a thank-you response or a notice of any kind following a particular event. The present invention can also provide assistance as a pre-need tool or prospecting tool for the attendees. This concept will allow for families to be able to send "Thank You's" at a quick pace. The invention will ease sending responses for various events regardless of whether names and addresses are hand written or printed. The invention can be used for funerals, weddings, birthday and graduation parties or anyplace that guests register to insure clarity. Further, the invention will insure that spellings and addresses are correct. The invention can also be used in a computer based kiosk for to check on visitors or employees at a work or social environment.

For purposes of the claims appended hereto, the term address can include any physical address or virtual address, such as e-mail. Thus the scope of the invention should be determined by the appended claims and their legal equivalents, rather than by the embodiments provided.

What is claimed is:

1. A system for obtaining associated personal data of a person attending a reception site in order to provide a response to such person, which comprises:

a podium disposed at the reception site, wherein the reception site includes one of a funeral, a wedding, a birthday party, a convention, and a graduation party;

a computer based device operably disposed on said podium at the reception site having operating software thereon and follow-up software for receiving personal name and address information data for the person and event data and storing for subsequent retrieval said personal name and address information data and said event data in a memory of said computer based device; and an image acquisition device including a camera operably associated with said computer based device and said follow up software for acquiring an image data of the person while at said podium such that said follow-up software stores for subsequent retrieval said image data in a manner to be associated with said personal name and address information data in a memory of said computer based device.

2. The system for obtaining associated personal data of a person attending a reception site in order to provide a response to such person of claim 1, wherein said follow up software is equipped to initiate acquisition of said image data concurrent with receiving said personal name and address information data.

3. The system for obtaining associated personal data of a person attending a reception site in order to provide a response to such person of claim 1, wherein said follow-up software is operably associated with a preexisting database of preexisting names, addresses, telephone numbers, e-mail address, and image data for retrieval of one or more of said data in said preexisting database and which returns said data to said person for review while said person is at said podium.

4. The system for obtaining associated personal data of a person attending a reception site in order to provide a response to such person of claim 3, wherein said follow up software is equipped to employ said image data and employ bio-recognition software to generate said personal name and address information data and initiates said bio-recognition software when said person is at said podium.

5. The system for obtaining associated personal data of a person attending a reception site in order to provide a response to such person of claim 1, which further includes a tablet screen keyboard to permit one of hand written and typed entry of said personal name and address information data.

6. The system for obtaining associated personal data of a person attending a reception site in order to provide a response to such person of claim 1, wherein said follow-up software is equipped to initiate a predetermined follow up response upon acquiring personal name and address information data for such person at the reception site.

7. The system for obtaining associated personal data of a person attending a reception site in order to provide a response to such person of claim 6, wherein said computer based device is operably associated with a printing device to print said predetermined follow up response.

8. The system for obtaining associated personal data of a person attending a reception site in order to provide a response to such person of claim 1, wherein said computer based device is operably associated a web based server to enable web based viewing of said data.

9. The system for obtaining associated personal data of a person attending a reception site in order to provide a response to such person of claim 1, wherein said follow up software is equipped to selectively permit access to said data to a viewer.

10. A method for obtaining associated personal data of a person attending a reception site in order to provide a response to such person, which includes the steps of:
(a) disposing a podium at the reception site, wherein the reception site includes one of a funeral, a wedding, a birthday party, a convention, and a graduation party;
(b) operably disposing a computer based device on said podium at the reception site having operating software thereon and follow-up software for receiving personal name and address information data for the person and event data and storing for subsequent retrieval said personal name and address information data and said event data in a memory of said computer based device; and
(c) operably disposing an image acquisition device including a camera at said podium with said computer based device and said follow up software for acquiring an image data of the person while at said podium such that said follow-up software stores for subsequent retrieval said image data in a manner to be associated with said personal name and address information data in a memory of said computer based device.

11. The method of claim 10, wherein said event data includes wedding data.

12. The method of claim 10, wherein said event data includes funeral data.

13. The method of claim 10, wherein said event data includes anniversary data.

14. The method of claim 10, wherein said event data includes convention data.

15. The method of claim 10, wherein said event includes secured reception data.

16. The method of claim 10, wherein said image data and said personal name and address information data are concurrently obtained while said person is at said podium.

17. The method of claim 10, which includes employing a preexisting database of preexisting names, addresses, telephone numbers, e-mail address, and image data for retrieval of one or more of said data and which returns said data to said person for review while said person is at said podium.

18. The method of claim 10, which includes transmitting said data to a third party handler to provide a response to the person.

19. The method of claim 10, which includes restricting access to said data by employing security authorization to view said data.

20. The method of claim 10, wherein said event data includes birthday data.

* * * * *